(12) United States Patent
Hong et al.

(10) Patent No.: US 11,374,285 B2
(45) Date of Patent: Jun. 28, 2022

(54) SECONDARY BATTERY

(71) Applicant: LG CHEM, LTD., Seoul (KR)

(72) Inventors: Chul Gi Hong, Daejeon (KR); Dong Kyu Kim, Daejeon (KR); Dae Soo Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 442 days.

(21) Appl. No.: 16/346,014

(22) PCT Filed: Jun. 26, 2018

(86) PCT No.: PCT/KR2018/007231
§ 371 (c)(1),
(2) Date: Apr. 29, 2019

(87) PCT Pub. No.: WO2019/009556
PCT Pub. Date: Jan. 10, 2019

(65) Prior Publication Data
US 2020/0052267 A1  Feb. 13, 2020

(30) Foreign Application Priority Data

Jul. 4, 2017  (KR) .................. 10-2017-0084895

(51) Int. Cl.
*H01M 50/333*  (2021.01)
*B01D 39/16*  (2006.01)
(Continued)

(52) U.S. Cl.
CPC .......... *H01M 50/333* (2021.01); *B01D 39/16* (2013.01); *B01D 46/12* (2013.01); *H01M 50/60* (2021.01); *B01D 2275/10* (2013.01)

(58) Field of Classification Search
CPC .......................... H01M 50/333; H01M 50/60
See application file for complete search history.

(56) References Cited

U.S. PATENT DOCUMENTS 6,009,817 A  1/2000 Hanulik
9,153,388 B2  10/2015 Okada et al.
(Continued)

FOREIGN PATENT DOCUMENTS

CN  104241568 A  12/2014
CN  204179120 U  2/2015
(Continued)

OTHER PUBLICATIONS

Extended European Search Report, dated Dec. 16, 2019, for European Application No. 18/827740.4.
(Continued)

*Primary Examiner* — Olatunji A Godo
(74) *Attorney, Agent, or Firm* — Birch, Stewart, Kolasch & Birch, LLP

(57) ABSTRACT

A secondary battery according to the present invention including a battery case with an accommodation part accommodating an electrode assembly and an electrolyte, a fluid inlet/outlet port provided in the battery case to provide a moving passage through which a fluid is movable so that discharge of an inner gas and reinjection of the electrolyte are enabled, a gas discharge part restricting the discharge of the inner gas passing through the fluid inlet/outlet port, and an electrolyte reinjection part provided to reinject the electrolyte through the fluid inlet/outlet port.

13 Claims, 8 Drawing Sheets

(51) Int. Cl.
  *B01D 46/12*    (2022.01)
  *H01M 50/60*   (2021.01)

(56) References Cited

U.S. PATENT DOCUMENTS

| | | | |
|---|---|---|---|
| 9,397,325 | B2 | 7/2016 | Kinuta et al. |
| 2011/0045325 | A1* | 2/2011 | Anzai ............... H01M 50/394 |
| | | | 429/53 |
| 2012/0015218 | A1 | 1/2012 | Lee |
| 2013/0208405 | A1 | 8/2013 | Okada et al. |
| 2014/0120387 | A1 | 5/2014 | Kinuta et al. |

FOREIGN PATENT DOCUMENTS

| | | |
|---|---|---|
| JP | 10-501650 A | 2/1998 |
| JP | 2001-68084 A | 3/2001 |
| JP | 2004-296192 A | 10/2004 |
| JP | 2005-259355 A | 9/2005 |
| JP | 2008-166130 A | 7/2008 |
| JP | 4249698 B2 | 4/2009 |
| JP | 2009-187759 A | 8/2009 |
| JP | 2015-130310 A | 7/2015 |
| KR | 10-0615160 B1 | 8/2006 |
| KR | 10-2010-0051403 A | 5/2010 |
| KR | 10-2012-0069297 A | 6/2012 |
| KR | 10-2013-0134948 A | 12/2013 |
| KR | 10-2014-0015647 A | 2/2014 |
| KR | 10-2014-0067246 A | 6/2014 |
| KR | 10-2016-0150460 A | 12/2016 |
| WO | WO 2010/053256 A2 | 5/2010 |
| WO | WO 2010/140408 A1 | 12/2010 |

OTHER PUBLICATIONS

International Search Report for PCT/KR2018/007231 dated Oct. 2, 2018.

* cited by examiner

SECONDARY BATTERY

CROSS-REFERENCE TO RELATED APPLICATION

The present application claims the benefit of the priority of Korean Patent Application No. 10-2017-0084895, filed on Jul. 4, 2017, which is hereby incorporated by reference in its entirety.

TECHNICAL FIELD

The present invention relates to a secondary battery.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Secondary batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

Recently, the pouch-type battery in which a stack/folding type electrode assembly is built in a pouch-type battery case provided as an aluminum lamination sheet is attracting much attention due to its low manufacturing cost, small weight, easy shape deformation, and the like, and thus, its usage is gradually increasing.

DISCLOSURE OF THE INVENTION

Technical Problem

One aspect of the present invention is to provide a secondary battery of which performance is easily regenerated when the secondary battery is degraded.

Also, another aspect of the present invention is to provide a secondary battery in which reinjection of an electrolyte and discharge of an inner gas to the outside are enabled without breaking or damaging the secondary battery.

Furthermore, further another aspect of the present invention is to provide a secondary battery in which an inner gas is automatically discharged to the outside when an internal pressure of the secondary battery is equal to or greater than a predetermined level.

Technical Solution

A secondary battery according to an embodiment of the present invention comprises a battery case comprising an accommodation part accommodating an electrode assembly and an electrolyte, at least one fluid inlet/outlet port provided in the battery case to provide a moving passage through which a fluid is movable so that discharge of an inner gas and reinjection of the electrolyte are enabled, at least one gas discharge part restricting the discharge of the inner gas passing through the respective fluid inlet/outlet port, and at least one electrolyte reinjection part provided to reinject the electrolyte through the respective fluid inlet/outlet port, wherein each gas discharge part comprises at least one sealing cover covering and sealing the moving passage and an elastic member applying elastic force to the sealing cover to cover the moving passage, wherein, when the inner gas has a pressure greater than the elastic force of the respective elastic member, the respective moving passage covered by the respective sealing cover is opened to discharge the inner gas to an outside of the battery case.

Advantageous Effects

According to the present invention, the gas discharge part and the electrolyte reinjection part through which the reinjection of the electrolyte and the discharge of the inner gas are enabled may be provided to reinject the electrolyte and discharge the inner gas to the outside without breaking or damaging the secondary battery.

Also, according to the present invention, the gas discharge part may be provided to restrict the discharge of the inner gas so that the inner gas is automatically discharged when the internal pressure of the secondary battery is equal to or greater than the predetermined pressure.

Furthermore, according to the present invention, the gas filter part may be provided to filter the harmful gas when the inner gas of the secondary battery is discharged.

Also, according to the present invention, the electrolyte reinjection part may comprise the injection plug made of a polytetrafluoroethylene material. Thus, when the electrolyte is injected by using the syringe, the portion of the injection plug through which the injection needle passes may be automatically contracted to be easily re-sealed.

MODE FOR CARRYING OUT THE INVENTION

Figure 1:
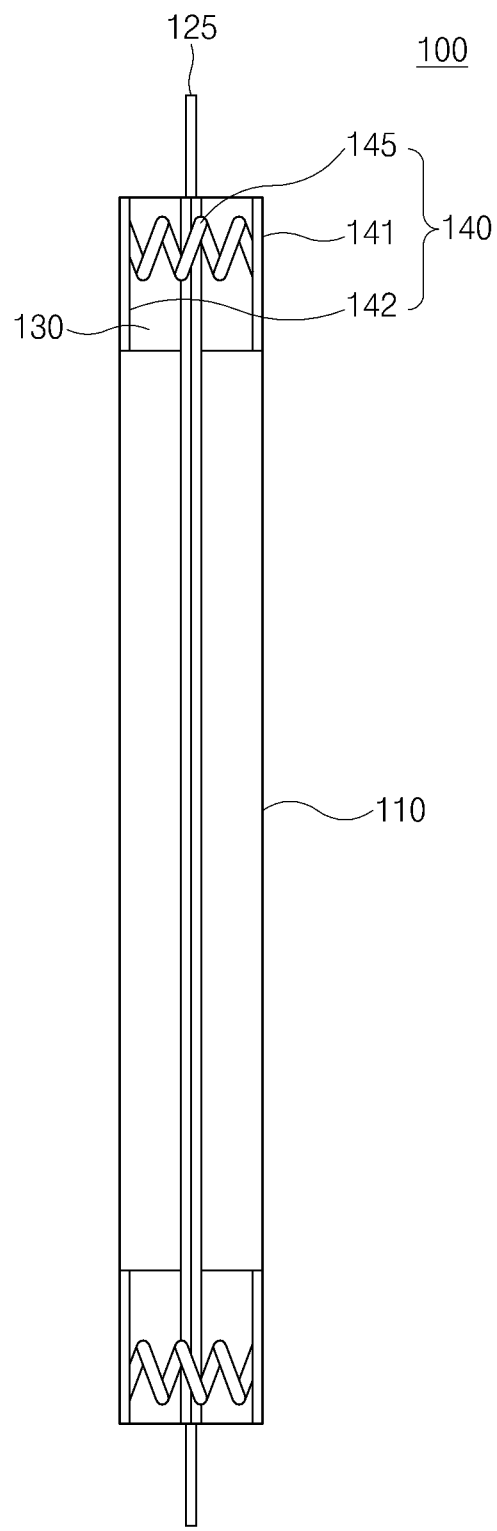
FIG. 1 is a front view of a secondary battery according to an embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Figure 2:
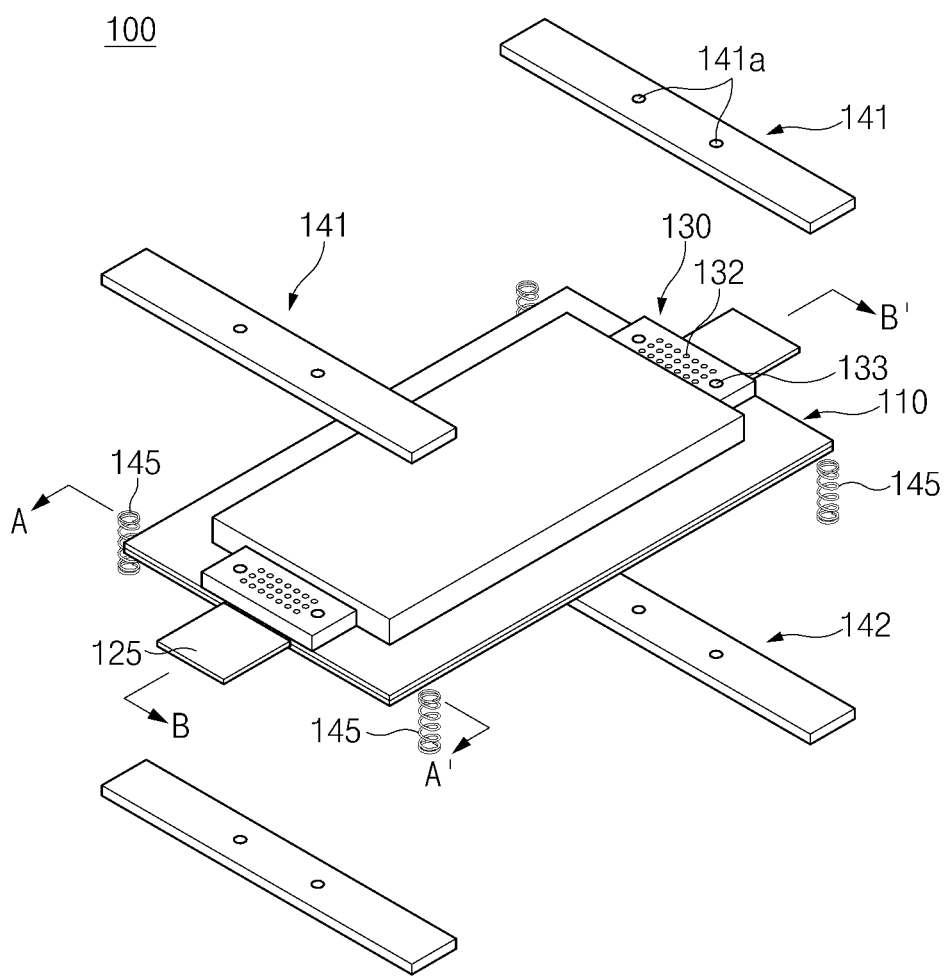
FIG. 2 is an exploded perspective view of the secondary battery according to an embodiment of the present invention.
Figure 3:
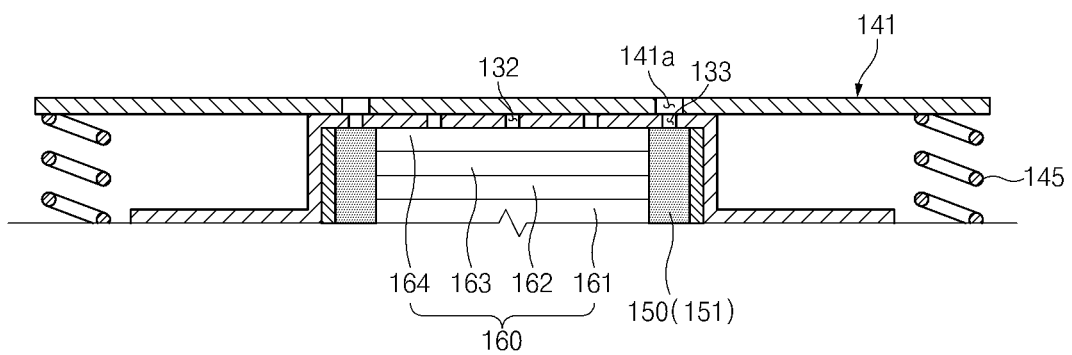
FIG. 3 is a cross-sectional view of a main part, taken along line A-A' of FIG. 2.

FIG. 1 is a front view of a secondary battery according to an embodiment of the present invention, FIG. 2 is an exploded perspective view of the secondary battery according to an embodiment of the present invention, and FIG. 3 is a cross-sectional view of a main part, taken along line A-A' of FIG. 2.

Referring to FIGS. 1 to 3, a secondary battery 100 according to an embodiment of the present invention comprises a battery case 110 accommodating an electrode assembly 120 and an electrolyte, a fluid inlet/outlet port 130 provided in the battery case 110, a gas discharge part 140 restricting discharge of an inner case, and an electrolyte reinjection part 150 provided to reinject the electrolyte.

Also, the secondary battery 100 according to an embodiment of the present invention may further comprise a gas filter part that filters the inner gas when the inner gas is discharged.

Figure 4:
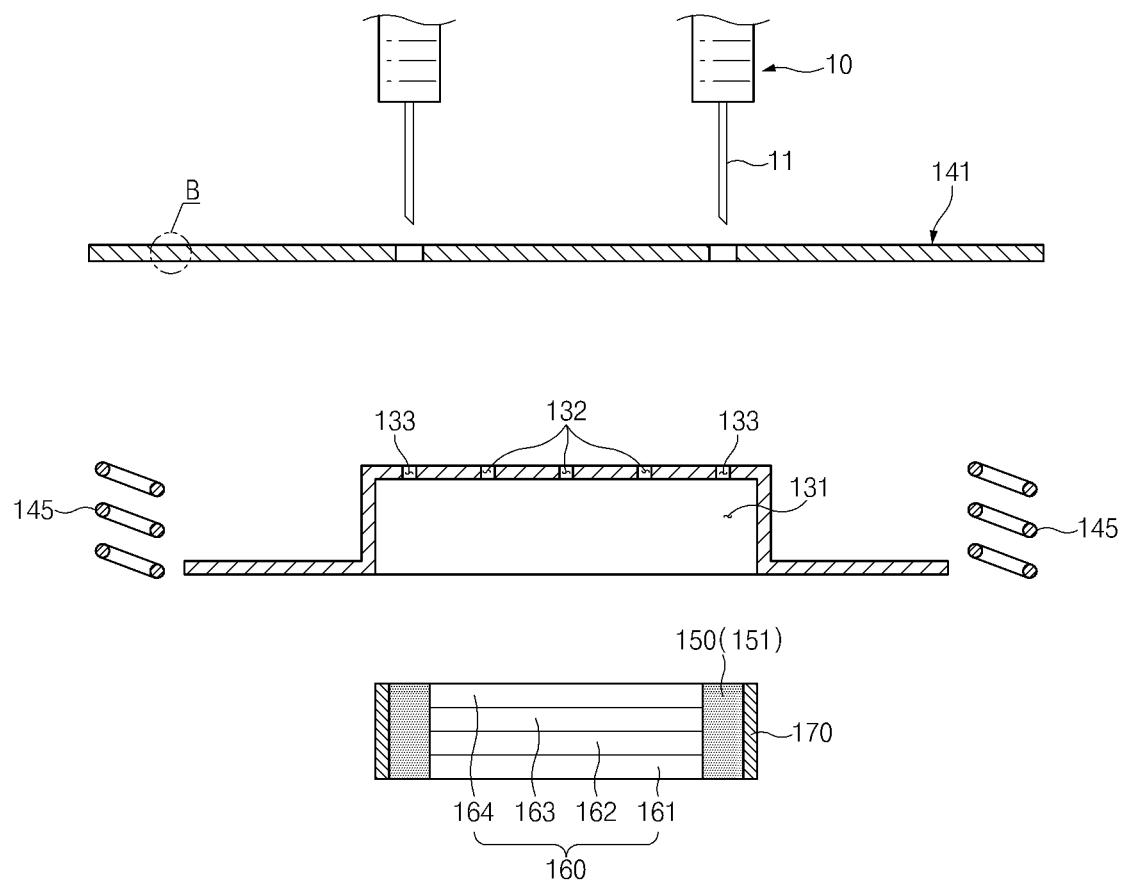
FIG. 4 is an exploded cross-sectional view of the main part, taken along line A-A' of FIG. 2.
Figure 5:
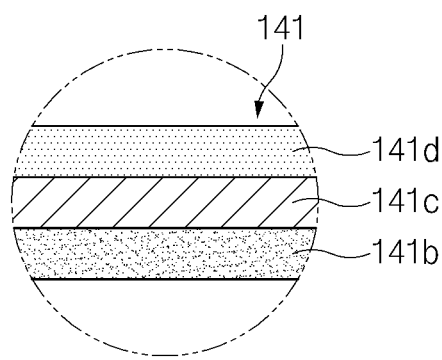
FIG. 5 is an enlarged cross-sectional view of a region B in FIG. 4.
Figure 6:
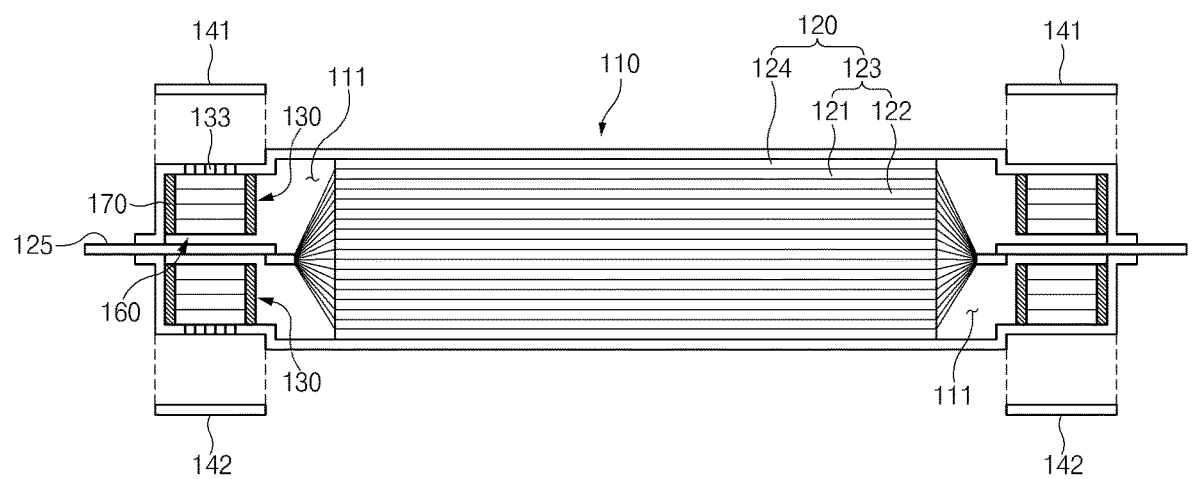
FIG. 6 is a cross-sectional view taken along line B-B' of FIG. 2.

FIG. 4 is an exploded cross-sectional view of the main part, taken along line A-A' of FIG. 2, FIG. 5 is an enlarged cross-sectional view of a region B in FIG. 4, and FIG. 6 is a cross-sectional view taken along line B-B' of FIG. 2.

Hereinafter, the secondary battery according to an embodiment of the present invention will be described in more detail with reference to FIGS. 1 to 6.

Referring to FIGS. 2 and 6, the battery case 110 has an accommodation part 111, in which the electrode assembly 120 and the electrolyte are accommodated, therein.

The electrode assembly 120 may be a chargeable and dischargeable power generation element and have a structure in which an electrode 123 and a separator 124 are combined and alternately stacked. Also, the electrode assembly 120 may comprise an electrode lead 125 electrically connected to the electrode 123. Here, the electrode lead 125 may comprise one side connected to the electrode 123 and the other side protruding to the outside of the battery case 110.

The electrode 123 may comprise a positive electrode 121 and a negative electrode 122. Here, the electrode assembly 120 may have a structure in which the positive electrode 121, the separator 124, and the negative electrode 122 are alternately stacked.

The separator 124 is made of an insulation material to electrically insulate the positive electrode 121 from the negative electrode 122. Here, the separator 124 may be made of, for example, a polyolefin-based resin film such as polyethylene or polypropylene having micropores.

Referring to FIGS. 1 and 2, the fluid inlet/outlet port 130 may be provided in the battery case 110 to provide a moving passage through which a fluid is movable so that the inner gas is discharged, and the electrolyte is reinjected.

Also, the fluid inlet/outlet port 130 may be provided in each of both ends of the battery case 110. Here, for example, four fluid inlet/outlet ports may be provided in both sides of both the ends of the battery case 110, respectively.

Furthermore, referring to FIGS. 3 and 4, the fluid inlet/outlet port 130 may have a plurality of discharge holes 132, which form passages connected to the moving passage 131.

Also, the fluid inlet/outlet port 130 may have a plurality of through-holes 133 through which an injection needle 11 of a syringe 10 is insertable in a direction of the moving passage 131.

Here, for example, the plurality of discharge holes 132 may be formed in a central portion of the fluid inlet/outlet port 130, and the plurality of through-holes 133 may be formed in both sides of the fluid inlet/outlet port 130 on the plane.

Referring to FIGS. 4 and 6, the gas discharge part 140 may restrict the discharge of the inner gas passing through the moving passage 131 of the fluid inlet/outlet port 130.

Also, the gas discharge part 140 may comprise sealing covers 141 and 142 covering and sealing the moving passage 131 of the fluid inlet/outlet port 130 and an elastic member 145 applying elastic force to the sealing covers 141 and 142 to allow the sealing covers 141 and 142 to cover the moving passage 131.

Thus, when the inner gas has a pressure greater than the elastic force of the elastic member 145, the moving passage 131 covered by the sealing covers 141 and 142 may be opened to discharge the inner gas to the outside of the battery case 110.

For example, the sealing covers 141 and 142 may be provided in a pair to cover and seal the moving passages 131 of the fluid inlet/outlet ports 130 provided in both ends of the battery case 110, respectively. Here, the elastic member 145 may be provided between the pair of sealing covers 141 and 142 to apply the elastic force in a direction in which the pair of sealing covers 141 and 142 are closer to each other.

Also, the sealing covers 141 and 142 may cover an outer surface of the fluid inlet/outlet port 130 having the discharge hole 132 to seal the discharge hole 132.

Also, each of the sealing cover 141 and 142 may have a cover hole 141a into which the injection needle 11 is inserted to pass through the injection member 151. Here, the cover hole 141a may provide a passage connected to the through-hole 133 of the fluid inlet/outlet port 130 so that the injection needle 11 is insertable into the injection member 151.

Here, in the secondary battery 110 according to an embodiment of the present invention, the injection member 151, the through-hole 133 of the fluid inlet/outlet port 130, and the cover holes 141a of the sealing covers 141 and 142 may be arranged at corresponding position in a straight line. Thus, the injection needle 11 of the syringe 10 may be inserted into the cover hole 141a of each of the sealing covers 141 and 142 and then pass through the through hole 133 of the fluid inlet/outlet port 111 to reinject the electrolyte into the accommodation part 111 of the battery case 110 and collect the inner gas to be discharged.

Furthermore, referring to FIGS. 2, 4, and 5, each of the sealing covers 141 and 142 may be formed by laminating, for example, a hard ceramic cover 141b, a rubber sheet 141c, and a silica gel 141d.

Here, for example, each of the sealing covers 141 and 142 may be formed by sequentially laminating the rubber sheet 141c and the silica gel 141d on the hard ceramic cover 141b.

Here, for another example, each of the sealing covers 141 and 142 may be formed by sequentially laminating the rubber sheet 141c and the silica gel 141d on the inside of the hard ceramic cover 141b. That is, the hard ceramic cover 141b, the rubber sheet 141c, the silica gel 141d, the rubber sheet 141c, and the hard ceramic cover 141b may be sequentially laminated to form each of the sealing covers 141 and 142.

For example, four sealing covers 141 and 142 may be provided to seal outer surfaces of four fluid inlet/outlet ports 130 disposed on both sides of both the ends of the battery case 110, respectively. That is, for example, a pair of sealing covers 141 and 142 may be provided in two pairs, and thus, the two pairs of sealing covers 141 and 142 may be respectively disposed on both sides of the battery case 110.

The elastic member 145 may be provided as, for example, a plurality of coil springs. Also, both ends of the elastic member 145 may be respectively fixed to the pair of sealing covers 141 and 142. Here, for example, four elastic members 145 may be respectively provided to be disposed at four corners of the sealing covers 141 and 142.

Referring to FIGS. 3 and 4, the electrolyte reinjection part 150 may be provided so that the electrolyte is reinjected through the fluid inlet/outlet port 130.

Also, the electrolyte reinjection part 150 comprises an injection member 151 provided on the moving passage 131.

The injection needle 11 of the syringe 10 for reinjecting the electrolyte may pass through the injection member 151. After being injected, the portion of the injection member 151, through which the injection needle 11 passes, may be contracted to be re-sealed.

Here, the injection member 151 may be made of a high contractive material.

Here, in the injection member 151, the gas filter part 160 made of, for example, a polytetrafluoroethylene (PTFE) material may be provided on the moving passage 131 to be close to the fluid inlet/outlet port 130, thereby filtering harmful components when the inner gas is discharged.

Also, for example, the gas filter part 160 may be disposed at a central side on the moving passage, and the injection member 151 may be disposed at each of both sides of the gas filter part 160 on the moving passage.

Furthermore, the gas filter part 160 may comprise a porous ceramic plate 161 and a plurality of filter layers laminated on the porous ceramic plate 161.

Here, the plurality of filter layers may comprise a first filter 162, a second filter 163, and a third filter 164, which are sequentially laminated, so that the inner gas is filtered by passing through the first filter 162, the second filter 163, and the third filter 164.

Here, for example, the first filter 162 may comprise a charcoal dust filter, the second filter 163 may comprise a charcoal filter, and the third filter 164 may comprise an aerosol filter.

The secondary battery 110 according to an embodiment of the present invention may further comprise a side case 170 surrounding side surfaces of the gas filter part 160 and the injection member 151. Here, the side case 170 may be made of hard ceramic. Thus, when the injection needle 11 passing through the injection member 151 is removed, the injection member 151 may be contracted to easily seal the portion of the injection member 151, through which the injection needle 11 passes. That is, since force generated by the injection needle 11 passing through the injection member 151 acts in a lateral direction, the hard ceramic may surround the side surface of the injection member 151 to prevent the injection member 151 from being expanded in the lateral direction when the injection needle 11 passes through the injection member 151. Thus, the contraction force of the portion of the injection member 151, through which the injection needle 11 passes, may be maintained, and thus, after the injection needle 11 is removed, the penetrated portion may be contracted to be easily sealed.

Figure 7:
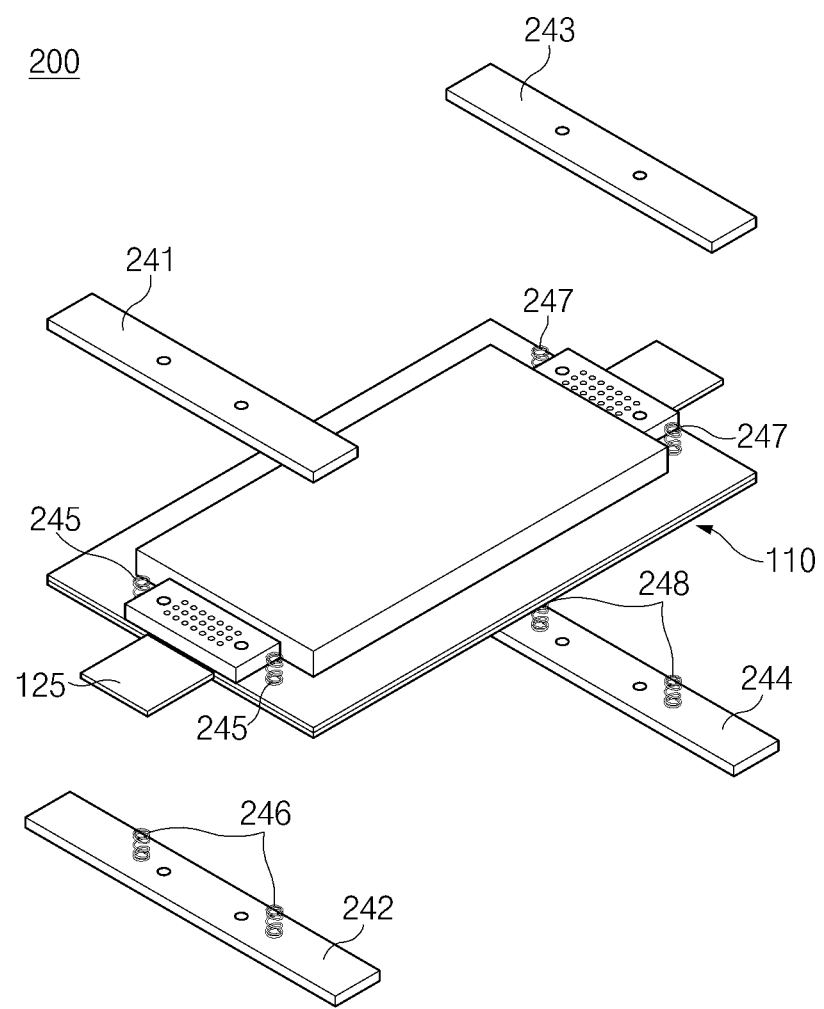
FIG. 7 is an exploded perspective view of a secondary battery according to another embodiment of the present invention.
Figure 8:
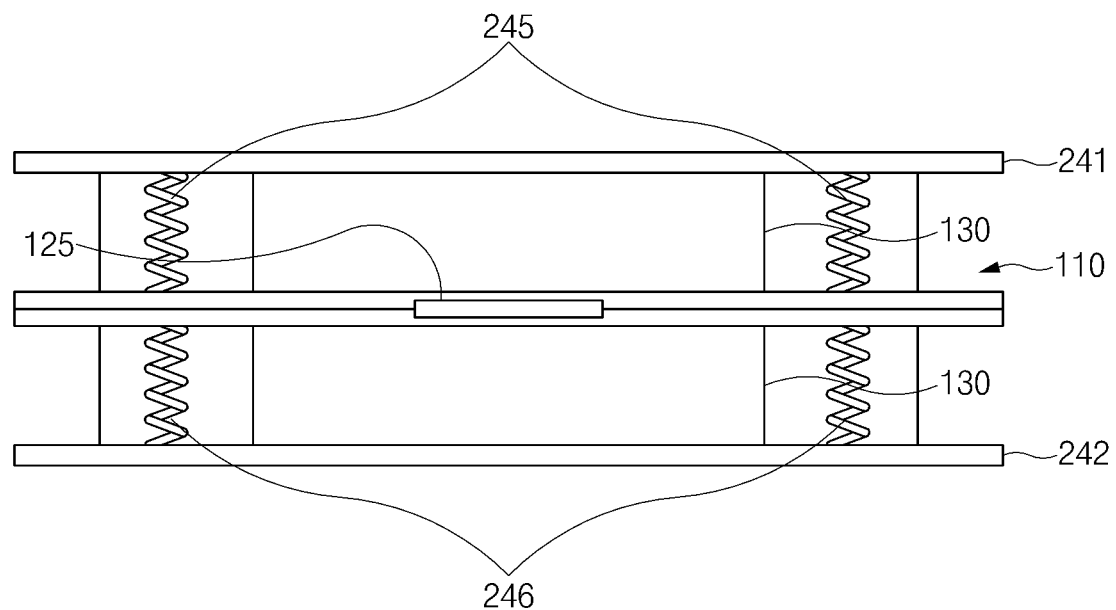
FIG. 8 is a side view of the secondary battery according to another embodiment of the present invention.

FIG. 7 is an exploded perspective view of a secondary battery according to another embodiment of the present invention, and FIG. 8 is a side view of the secondary battery according to another embodiment of the present invention.

Referring to FIGS. 7 and 8, a secondary battery 200 according to another embodiment of the present invention comprises a battery case 110 accommodating an electrode assembly 120 and an electrolyte, a fluid inlet/outlet port 130 provided in the battery case 110, a gas discharge part 240 restricting discharge of an inner case, and an electrolyte reinjection part 150 provided to reinject the electrolyte. Here, in the secondary battery 200 according to another embodiment of the present invention, the gas discharge part 240 may comprise sealing covers 241, 242, 243, and 244 covering and sealing the moving passage 131 of the fluid inlet/outlet port 130 and elastic members 245, 246, 247, and 248 applying elastic force to the sealing covers 241, 242, 243, and 244 to allow the sealing covers 241, 242, 243, and 244 to cover the moving passage 131.

Hereinafter, the secondary battery according to another embodiment of the present invention will be described in detail with reference to FIGS. 7 and 8.

Referring to FIGS. 7 and 8, the secondary battery 200 according to another embodiment of the present invention is different from the secondary battery 100 according to the foregoing embodiment in that the sealing covers 241, 242, 243, and 244 of the gas discharge part 240 are provided in plurality and elastically supported by the plurality of elastic members 245, 246, 247, and 248 to respectively seal the plurality of fluid inlet/outlet ports 130. Thus, contents of this embodiment, which are duplicated with those according to the forgoing embodiment, will be briefly described, and also, differences therebetween will be mainly described.

In more detail, in the secondary battery 200 according to another embodiment of the present invention, the plurality of fluid inlet/outlet ports 130 are provided in the battery case 110. Here, the gas discharge part 240 may be provided in plurality. The plurality of gas discharge parts 240 may be respectively provided on the plurality of fluid inlet/outlet ports 130 to individually restrict discharge of an inner gas passing through the plurality of fluid inlet/outlet ports 130.

Also, for example, four fluid inlet/outlet ports 130 may be provided on both sides of both ends of the battery case 110, respectively. Here, the sealing covers 241, 242, 243, and 244 of the gas discharge part 240 may be provided in plurality. For example, four sealing covers 241, 242, 243, and 244 may be provided to cover and seal moving passages 131 of the fluid inlet/outlet ports 130, respectively.

Here, the elastic members 245, 246, 247, and 248 may elastically support the plurality of sealing covers 241, 242, 243, and 244, respectively. Here, the elastic members 245, 246, 247, and 248 may be provided in plurality to support both sides of the sealing covers 241, 242, 243, and 244, respectively. That is, for example, two or four of the elastic members may be provided on one of the sealing covers 241, 242, 243, and 244 to elastically support the sealing covers 241, 242, 243, and 244, respectively. Here, each of the elastic members 245, 246, 247, and 248 may have one end fixed to the battery case 110 and the other end fixed to each of the sealing covers 241, 242, 243, and 244.

While the present invention has been particularly shown and described with reference to exemplary embodiments thereof, it is to be understood that the scope of the present invention is not limited to the secondary battery according to the present invention. It will be understood by those of ordinary skill in the art that various changes in form and details may be made therein without departing from the spirit and scope of the invention.

Furthermore, the scope of protection of the present invention will be clarified by the appended claims.

The invention claimed is:

1. A secondary battery comprising:
   a battery case comprising an accommodation part accommodating an electrode assembly and an electrolyte;
   at least one fluid inlet/outlet port provided in the battery case to provide a moving passage through which a fluid is movable so that discharge of an inner gas and reinjection of the electrolyte are enabled;
   at least one gas discharge part restricting the discharge of the inner gas passing through the at least one fluid inlet/outlet port; and
   at least one electrolyte reinjection part provided to reinject the electrolyte through the at least one fluid inlet/outlet port,
   wherein the at least one gas discharge part comprises:
   at least one sealing cover covering and sealing the moving passage by contacting an exterior surface of the battery case; and
   an elastic member applying elastic force to the sealing cover to cover the moving passage,
   wherein, when the inner gas has a pressure greater than the elastic force of the elastic member, the moving passage covered by the at least one sealing cover is opened to discharge the inner gas to an outside of the battery case.

2. The secondary battery of claim 1, wherein the at least one fluid inlet/outlet port comprises two fluid inlet/outlet ports, wherein each fluid inlet/outlet port is provided on one of two ends of the battery case,
   wherein the at least one gas discharge part comprises two gas discharge parts, each gas discharge part being provided on one of the two ends of the battery case,
   wherein the at least one sealing cover comprises a pair of sealing covers to cover and seal the moving passage provided in each of the two ends of the battery case, and
   wherein the elastic member is provided between the pair of sealing covers to apply the elastic force in a direction in which the pair of sealing covers are closer to each other.

3. The secondary battery of claim 2, wherein the elastic member comprises a plurality of coil springs.

4. The secondary battery of claim 1, wherein the at least one fluid inlet/outlet port has a discharge hole forming a passage connected to the moving passage, and
   wherein the at least one sealing cover of the at least one gas discharge part covers an outer surface of the at least one fluid inlet/outlet port having the discharge hole to seal the discharge hole, thereby sealing the moving passage.

5. The secondary battery of claim 1, further comprising a gas filter part provided on the moving passage to be close to the at least one fluid inlet/outlet port, thereby filtering harmful components when the inner gas is discharged.

6. A secondary battery comprising:
   a battery case comprising an accommodation part accommodating an electrode assembly and an electrolyte;
   at least one fluid inlet/outlet port provided in the battery case to provide a moving passage through which a fluid is movable so that discharge of an inner gas and reinjection of the electrolyte are enabled;
   at least one gas discharge part restricting the discharge of the inner gas passing through the at least one fluid inlet/outlet port; and
   at least one electrolyte reinjection part provided to reinject the electrolyte through the at least one fluid inlet/outlet port,
   wherein the at least one gas discharge part comprises:
   at least one sealing cover covering and sealing the moving passage; and
   an elastic member applying elastic force to the sealing cover to cover the moving passage,
   wherein, when the inner gas has a pressure greater than the elastic force of the elastic member, the moving passage covered by the at least one sealing cover is opened to discharge the inner gas to an outside of the battery case,
   wherein the at least one electrolyte reinjection part comprises an injection member provided on the moving passage, and
   wherein a portion of the injection member through which an injection needle passes is contracted and sealed after the injection needle of a syringe for reinjecting the electrolyte passes through the injection member so as to inject the electrolyte.

7. The secondary battery of claim 6, wherein the injection member is made of a polytetrafluoroethylene (PTFE) material.

8. The secondary battery of claim 6, wherein the gas filter part is disposed at a central side on the moving passage, and the injection member is disposed at each of both sides of the gas filter part on the moving passage.

9. The secondary battery of claim 8, further comprising a side case surrounding a circumference of a side surface of the gas filter part and the injection member.

10. The secondary battery of claim 9, wherein the side case is made of hard ceramic.

11. A secondary battery comprising:
    a battery case comprising an accommodation part accommodating an electrode assembly and an electrolyte;
    at least one fluid inlet/outlet port provided in the battery case to provide a moving passage through which a fluid is movable so that discharge of an inner gas and reinjection of the electrolyte are enabled;
    at least one gas discharge part restricting the discharge of the inner gas passing through the at least one fluid inlet/outlet port; and
    at least one electrolyte reinjection part provided to reinject the electrolyte through the at least one fluid inlet/outlet port,
    wherein the at least one gas discharge part comprises:
    at least one sealing cover covering and sealing the moving passage; and
    an elastic member applying elastic force to the sealing cover to cover the moving passage;
    a gas filter part provided on the moving passage to be close to the at least one fluid inlet/outlet port, thereby filtering harmful components when the inner gas is discharged,
    wherein, when the inner gas has a pressure greater than the elastic force of the elastic member, the moving passage covered by the at least one sealing cover is opened to discharge the inner gas to an outside of the battery case,
    wherein the gas filter part comprises:
    a porous ceramic plate; and
    a plurality of filter layers laminated on the porous ceramic plate.

12. The secondary battery of claim 6, wherein a discharge hole forming a passage connected to the moving passage is provided in the at least one fluid inlet/outlet port, wherein at least one sealing cover of the gas discharge part covers an outer surface of the at least one fluid inlet/outlet port having the discharge hole to seal the discharge hole, thereby sealing the moving passage, wherein a cover hole is provided in the at least one sealing cover so that the injection needle is inserted to pass through the injection member, and wherein a through-hole is provided in the at least one fluid inlet/outlet port to correspond to the cover hole.

13. The secondary battery of claim 1, wherein the at least one sealing cover is formed by laminating a hard ceramic cover, a rubber sheet, and silica gel.

\* \* \* \* \*